(12) United States Patent
Minkenberg et al.

(10) Patent No.: US 10,042,683 B2
(45) Date of Patent: *Aug. 7, 2018

(54) ALL-TO-ALL MESSAGE EXCHANGE IN PARALLEL COMPUTING SYSTEMS

(71) Applicant: INTERNATIONAL BUSINESS MACHINES CORPORATION, Armonk, NY (US)

(72) Inventors: Cyriel J. Minkenberg, Gutenswil (CH); Bogdan Prisacari, Adliswil (CH); German Rodriguez Herrera, Adliswil (CH)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/490,293

(22) Filed: Apr. 18, 2017

(65) Prior Publication Data

US 2017/0220398 A1    Aug. 3, 2017

Related U.S. Application Data

(63) Continuation of application No. 15/131,278, filed on Apr. 18, 2016, now Pat. No. 9,740,542, which is a (Continued)

(30) Foreign Application Priority Data

Feb. 22, 2013    (GB) ...................... 1303181

(51) Int. Cl.
G06F 9/54        (2006.01)
G06F 13/40     (2006.01)
G06F 9/48       (2006.01)

(52) U.S. Cl.
CPC ............ G06F 9/546 (2013.01); G06F 9/4881 (2013.01); G06F 13/4068 (2013.01)

(58) Field of Classification Search
CPC ..... G06F 9/546; G06F 9/4881; G06F 13/4068
See application file for complete search history.

(56) References Cited

U.S. PATENT DOCUMENTS 7,646,800 B2    1/2010    Kim et al.
9,329,914 B2 *  5/2016    Minkenberg ............ G06F 9/546
(Continued)

FOREIGN PATENT DOCUMENTS

CN    102868782 A    1/2013

OTHER PUBLICATIONS

Kumar et al., "Extended Hypercube: A Hierarchical Interconnection Network of Hypercubes", IEEE, vol. 3 No. 3, Jan. 1992, pp. 1-13.
(Continued)

*Primary Examiner* — Umut Onat
(74) *Attorney, Agent, or Firm* — Cantor Colburn LLP; David Quinn

(57) ABSTRACT

A method for all-to-all message exchange between program tasks including N>1 hierarchy levels $l_n$, n=1 to N, in which a first level $l_1$ includes a plurality of group tasks and each higher level $l_{(n>1)}$ includes at least one group of level $l_{(n-1)}$ groups to which that task belongs in respective hierarchy levels of the network topology; sending a message via the interconnection network to a respective destination task whose hierarchical identifier is determined; and using the hierarchical identifier to send the program task and the network topology, such that the resulting exchange pattern for the all-to-all message exchange exploits a hierarchical distance in the network topology in a desired manner.

7 Claims, 8 Drawing Sheets

Related U.S. Application Data continuation of application No. 14/178,413, filed on Feb. 12, 2014, now Pat. No. 9,329,914.

(56) References Cited

U.S. PATENT DOCUMENTS

| | | |
|---|---|---|
| 9,740,542 B2 * | 8/2017 | Minkenberg ............ G06F 9/546 |
| 2005/0105515 A1 | 5/2005 | Reed et al. |
| 2010/0049942 A1 | 2/2010 | Kim et al. |
| 2012/0144065 A1 | 6/2012 | Parker et al. |
| 2013/0022047 A1 | 1/2013 | Nakashima et al. |
| 2014/0140341 A1 | 5/2014 | Bataineh et al. |

OTHER PUBLICATIONS

Rodriguez et al.,"Exploring pattern-aware routing in generalized fat tree networks", Research Gate, Jun. 8-12, 2009, pp. 1-11.
Sanders, et al.,"The Hierarchical factor algorithm for all-to-all commucation", Parallel Processing, Euro-Par, 2002, pp. 1-5.
Thakur et al.,"Optimization of Collective Communication Operations in MPICH", Spring, The international Journal of High Performance computing applications, vol. 19, No. 1, pp. 1-17.

* cited by examiner

ALL-TO-ALL MESSAGE EXCHANGE IN PARALLEL COMPUTING SYSTEMS

DOMESTIC AND FOREIGN PRIORITY

This application is a continuation of the legally related U.S. application Ser. No. 15/131,278 filed Apr. 18, 2016 which is a continuation of U.S. application Ser. No. 14/178,413 filed Feb. 12, 2014 now U.S. Pat. No. 9,329,914; which claims priority under 35 U.S.C. § 119 from GB1303181.0 filed Feb. 22, 2013, which is fully incorporated herein by reference.

BACKGROUND

This invention relates generally to all-to-all message exchange operations in parallel computing systems, more specifically, the present invention relates to methods for all-to-all message exchange between program tasks connected by a hierarchical interconnection network.

In parallel computing systems, programs can be executed by a plurality of compute nodes operating in parallel. The compute nodes might in general be separate machines (e.g. workstations, servers), processors, cores, etc., depending on the hardware level at which parallelism is implemented. An individual compute node can execute one or more of the parallel program entities, or tasks, of a parallel algorithm (where the term "task" herein refers to such a program entity in general without implying any particular level of granularity). Most parallel algorithms alternate between phases of computation and communication, wherein data is exchanged by the program tasks. The set of compute nodes which collectively implement the parallel algorithm are commonly interconnected via a network to permit this data exchange.

The way in which data is exchanged among a group of parallel tasks can vary widely, but, in practice, most data exchanges involving more than a pair of tasks can be mapped to a small set of typical exchanges. One of the most widely used collective communication operations is the all-to-all exchange (sometimes referred to as an all-exchange, index operation or personalized all-to-all exchange). In an all-to-all message exchange, each task in a given set must send one distinct message to every other task in that set (and in some cases also to itself). The exchange operation is typically organized in a succession of phases, the number of which equals the number of messages to be sent by each task, such that each task sends one message in each phase of the exchange. The overall exchange pattern, i.e. the pattern according to which source (sending) tasks communicate with destination (receiving) tasks in the successive phases of the exchange, is fundamental to the overall efficiency of the exchange. A simple way to verify this is to consider the extreme case where all sending tasks choose the same destination task simultaneously in a given phase. All senders will experience congestion because of the serialization of messages at the input port of the receiver. All these blocked messages in the interconnection network can create even more congestion and severely impact performance. This extreme example is easily circumvented, and most all-to-all exchange proposals address this particular scenario.

Formally, an all-to-all exchange pattern is completely characterized by the function $f:IN \times IN \rightarrow IN$ that takes a source task index (s) and a phase index (p) and maps them to a destination task index (d), such that each s sends one (and only one) message to each d, and each d receives one (and only one) message from each s. Two very common exchanges, present in most communication libraries are:

(a) the linear shift (or "strided") exchange represented by:
(s, p)→(s+p+shift) modulo X, where "shift" is a fixed integer value and X is the total number of communicating tasks; and (b) the XOR ("binary XOR" or "recursive halving") exchange represented by:
(s, p)→s XOR p.

The exact structure of the interconnection network via which tasks are connected has a strong impact on message exchange operations. Such networks commonly have some form of hierarchical network topology. Hierarchical networks include explicitly hierarchical topologies, such as dragonfly networks, as well as tree-shaped topologies such as tree networks and fat tree networks (including extended generalized fat trees, slimmed fat trees, etc.). These are explained briefly in the following.

In tree-shaped topologies, the hierarchy is defined by the series of levels from the leaves (level 0) to the root(s) (level N) of the tree. Tasks are considered to be placed on the leaf nodes, whereas all other nodes are used for message routing. FIG. 1 of the accompanying drawings shows a simple example of a three-level tree interconnect with one task per compute node. The compute nodes, represented by circles, form the leaves in level 0 of the tree here. The higher levels are made up of switches (represented by squares) each of which is connected via links (represented by lines) to a group of descendants, or "children", in the immediately preceding level. In the example shown, level 1 switches are each connected to a group of three compute nodes in level 0. Level 2 switches are each connected to a group of three level 1 switches. Level 3, the highest level in this example, includes here of a single switch, again connected to a group of three switches in the preceding level. The well-known fat tree network topology is similar to such a standard tree topology—having N levels above the leaves in level 0 with each node on a level l having exactly $M_l$ descendants—with the difference that the connection between any given node and its parent is made up of multiple links. In the original design, the link capacity available from a node to its parent was equal to the aggregate link capacity from that node's children to itself. Consequently, the total capacity of each upward link at level l equals the total number of leaves reachable from the node where the upward link originates (which is equal to $M_1 \cdot M_2 \cdot \ldots \cdot M_l$ where "·" denotes multiplication) times the injection capacity per node. As this number grows exponentially with the height of the tree, the concept of extended generalized fat trees (XGFTs) was introduced. This class of topologies achieves a design that is functionally similar to that of basic fat tree networks, without requiring switches with capacity increasing exponentially towards the roots of the network. XGFTs are currently one of the most popular options for interconnect design in high performance computing.

Dragonfly networks are another well-known hierarchical network of which FIG. 2 shows a simple example. This example has one task per compute node (again represented by circles) which are connected in groups of two to respective switches (again represented by squares) in level 1 of the hierarchy. The higher levels are indicated by the broken lines in the figure. Level 2 includes four groups of level 1 switches, each level 2 group including a "local group" of three interconnected level 1 switches here. Level 3, the highest level here, includes a single group containing all four level 2 local groups.

While a given all-to-all exchange operation can complete successfully regardless of the underlying topology, the exchange pattern can result in sub-optimal performance. By way of illustration, FIG. 3 illustrates an exchange pattern for a linear shift exchange between sixteen tasks connected by an interconnection network with the hierarchical network topology shown in FIG. 4. The particular network implementation here can be an (N=2)-level tree-shaped network with the sixteen communicating tasks placed in respective compute nodes at the leaf level, four first-level switches and a single second-level switch. A first level, labelled $l_1$ here, of the topology hierarchy includes four $l_1$ groups, each of four tasks. The next (here highest) level, labelled $l_2$, includes a single $l_2$ group being the group of all four level $l_1$ groups. The exchange pattern of FIG. 3 illustrates the linear shift exchange pattern in this topology with a shift value of 0. The tasks are denoted by the circles, numbered 0 to 15 on the left of the figure. The lines in successive columns of the figure show the pairing of sending and destination tasks in the sixteen successive phases of the exchange. In phase 0, as indicated by the dotted lines here, each task sends a message to itself.

It is apparent from a consideration of the FIG. 3 exchange pattern that the linear shift exchange function completely ignores the layout of the network topology. This exchange pattern is thus oblivious to the hierarchical structure of the topology, taking no account of hierarchical distance (i.e. number of hierarchy levels which must be traversed for communication) between sending and receiving nodes. This concept of hierarchical distance is, however, fundamental to hierarchical networks, providing a notion of locality/remoteness which is inherent in these topologies. The fewer hierarchy levels that separate a pair of tasks, the "closer" the tasks are, i.e., the shorter the path between them, and the lower the latency to reach each other.

FIG. 5 shows the exchange pattern obtained with the XOR exchange algorithm for the hierarchical network topology of FIG. 4. It can be seen that the first four phases handle local exchanges between tasks in the same level $l_1$ group. The subsequent phases handle exchanges between nodes in different level $l_1$ groups. As illustrated by this simple example, application of the XOR exchange pattern in this network topology results in the message exchange being performed in increasing order of remoteness. Thus, tasks collocated on the same node first perform exchanges among themselves (if there is more than one task per compute node), then tasks in neighboring nodes (in the hierarchical sense) perform exchanges exclusively among themselves (so intra-node exchanges are excluded), and so on, progressing through the hierarchy. This has the advantage of ensuring that traffic is contained as much as possible at lower levels in a majority of phases, as well as ensuring that communication latency is constant (when no contention is present) between all pairs in a given phase. This provides much better synchronization within each of the phases. Synchronization is a critical factor in optimizing the overall performance of the exchange, as desynchronization implies either that subsequent phases will overlap, thus causing additional contention, or that gaps in between subsequent phases will emerge.

A severe limitation of the XOR exchange is that it usable only when the number of interconnected nodes where tasks can be placed is an integer power of two. This excludes many networks of practical interest, including dragonfly networks. Furthermore, the XOR exchange is only then usable if the application can be partitioned in a power of two number of tasks. Indeed, the algorithm only achieves the "increasing remoteness" feature described above through restriction of its application to this limited class of networks. The algorithm itself is still oblivious to the true network topology, simply performing bit-wise modulo-2 addition of the binary representations of the source task index s and phase index p irrespective of the physical network hierarchy. In the example of FIGS. 4 and 5, for instance, the XOR exchange behaves as if for an overlaid topology having four levels, with two tasks in each level $l_1$ group, and each level $l_{(n>1)}$ group containing two level $l_{(n-1)}$ groups. Each real hierarchy level in the network topology of FIG. 4 is thus effectively separated into two overlaid levels. Consequently, we see a differentiation of the local and remote exchanges into two separate categories, one involving only one overlaid sub-level and one involving the other. It can therefore be seen that the way in which the XOR function determines destination tasks for messages is not dependent on the actual network topology, but rather on a simple overlaid structure which can be imposed on only a limited class of network topologies.

In practice, parallel computing systems rarely comply with the limitations necessary for use of the XOR exchange function, especially as regards the underlying network topology. Because of this, one often resorts to using the less effective, but more generic, linear shift exchange discussed above. Unbalanced and suboptimal application of the XOR pattern in power-of-two sub-partitions of the original number of nodes has also been proposed in "Optimization of Collective Communication Operations in MPICH", Thakur et al., International Journal of High Performance Computing Applications, Vol. 19, No. 1, Spring 2005, pp. 49-66. In "The Hierarchical Factor Algorithm for All-to-All Communication", Sanders et al., Proceedings of the 8th International Euro-Par Conference on Parallel Processing, 2002, LNCS 2400, pp. 799-803, an approach is described for hierarchical systems with nodes having different numbers of processors whereby messages are exchanged in order of node size (number of processors in a node).

Improvements in all-to-all exchange operations for hierarchical networks would be highly desirable.

SUMMARY

The present invention provides a method for all-to-all message exchange between program tasks connected by an interconnection network with a hierarchical network topology including N>1 hierarchy levels $l_n$, n=1 to N, in which a first level $l_1$ includes a plurality of groups of tasks, and each higher level $l_{(n>1)}$ includes at least one group of level $l_{(n-1)}$ groups, the method including: defining, for each task, a hierarchical identifier which is unique and dependent on the level groups to which each task belongs in respective hierarchy levels of the hierarchical network topology; sending a message, at each task in each of successive phases of the exchange, via the interconnection network to a respective destination task whose hierarchical identifier is determined; and using the hierarchical identifier to send the program task and the network topology, such that the resulting exchange pattern for the all-to-all message exchange exploits a hierarchical distance in the hierarchical network topology in a desired manner.

Another aspect of the present invention provides a parallel computing system for all-to-all message exchange between program tasks connected by an interconnection network with a hierarchical network topology, including: a plurality of compute nodes containing program tasks which are connected by an interconnection network of the system, the interconnection network having a hierarchical network topology including hierarchy levels $l_n$, n=1 to N, in which a first level $l_1$ includes a plurality of groups of tasks and each higher level $l_{(n>)}$ includes at least one group of level $l_{(n-1)}$ groups.

Another aspect of the present invention provides a compute node of a parallel computing system for all-to-all message exchange between program tasks connected by an interconnection network with a hierarchical network topology, including: a plurality of compute nodes containing program tasks which are connected by an interconnection network of the system, the interconnection network having a hierarchical network topology including hierarchy levels $l_n$, n=1 to N, in which a first level $l_1$ includes a plurality of groups of tasks and each higher level $l_{(n>1)}$ includes at least one group of level $l_{(n-1)}$ groups.

DETAILED DESCRIPTION

Figure 1:
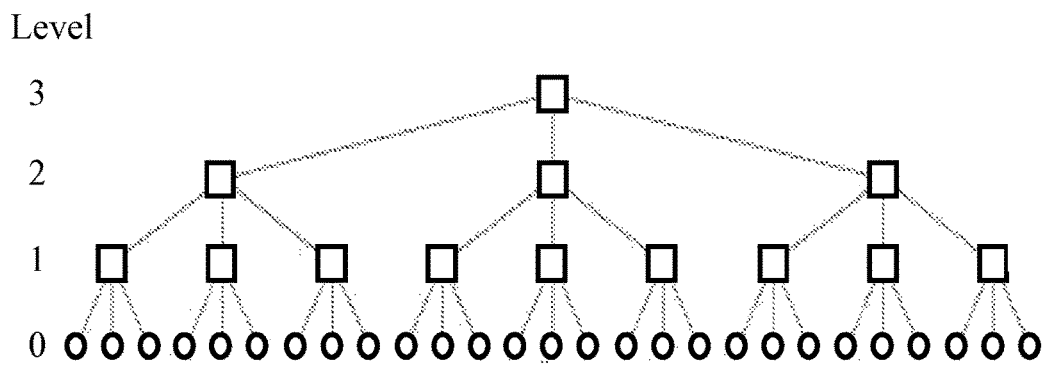
FIG. 1 shows an example of a tree-shaped interconnection network, according to an embodiment of the present invention.

According to an embodiment of the present invention, a first aspect of the present invention provides a method for all-to-all message exchange between program tasks connected by an interconnection network with a hierarchical network topology including N>1 hierarchy levels $l_n$, n=1 to N, in which a first level $l_1$ includes a plurality of groups of tasks and each higher level $l_{(n>1)}$ includes at least one group of level $l_{(n-1)}$ groups. The method includes: defining, for each task, a unique hierarchical identifier dependent on the groups to which that task belongs in respective hierarchy levels of the network topology; and at each task, in each of successive phases of the exchange, sending a message via the network to a respective destination task whose hierarchical identifier is determined, in dependence on the hierarchical identifier of the sending task and the network topology, such that the resulting exchange pattern for the all-to-all message exchange exploits hierarchical distance in the network topology in a desired manner.

Methods embodying the invention thus provide for all-to-all message exchange in systems where the network via which tasks communicate has a hierarchical topology. The hierarchical identifiers for tasks depend on the groups to which those tasks belong in different hierarchy levels of the topology, and thus capture hierarchical information about the network. In each phase of the message exchange process, the tasks each send a message to a respective destination task, whereby each task both sends and receives a message in each successive phase. For sending tasks in a given phase, the hierarchical identifier of the destination task for each message is determined based on both the hierarchical identifier of the sending task and the network topology, exploiting hierarchical distance in the network topology in a desired manner. Thus, unlike prior exchanges discussed above, the exchange operation is truly "topology-aware" in the sense that it depends on the actual hierarchical topology of the physical network (as opposed to some fixed topology, as is embedded in the XOR exchange function for instance, of an overlay imposed on top of the real network topology). This allows hierarchical distance in the network topology to be exploited as desired, offering highly efficient exchange patterns in hierarchical networks. Moreover, methods embodying the present invention are not restricted to a limited class of networks like the XOR exchange discussed above. As demonstrated by examples described below, topology-aware exchange methods embodying the invention offer significant performance benefits and can be readily adapted to differing performance requirements, allowing optimization of exchanges according to different criteria for different types of hierarchical network.

The exchange pattern in embodiments of the invention can exploit hierarchical distance in the network topology in a variety of ways. For example, the exchange pattern can implement the message exchange (wholly or partially) in order of increasing hierarchical distance. The exchange can thus occur in order of "increasing remoteness" as discussed above. Embodiments of the present invention are further adapted to improve some particular aspect of operation such as load-balancing, latency, intra-phase synchronization or bandwidth efficiency. With some exchanges embodying the invention, the exchange pattern proceeds to some extent in order of increasing remoteness, departing from this order to achieve a desired degree of bandwidth optimization. In a particular example to be described, the exchange pattern exploits hierarchal distance by ensuring that the degree of increasing remoteness is effectively minimized and complete bandwidth-optimization is achieved.

While embodiments of the present invention might be envisaged where the particular sequence of destination tasks for successive messages is pre-calculated for each sending task, the hierarchical identifier of the appropriate destination task for each message is typically determined dynamically at each task. Hence, methods embodying the invention preferably include, at each task, dynamically determining the hierarchical identifier of the destination task for the message sent in each phase of the exchange.

A second aspect of the invention provides a parallel computing system including a plurality of compute nodes containing program tasks which are connected by an interconnection network of the system, the network having a hierarchical network topology including N>1 hierarchy levels $l_n$, n=1 to N, in which a first level $l_1$ includes a plurality of groups of tasks and each higher level $l_{(n>1)}$ includes at least one group of level $l_{(n-1)}$ groups, wherein the system is adapted to perform a method according to the first aspect of the invention for all-to-all message exchange between program tasks.

A third aspect of the invention provides a compute node of a parallel computing system according to the second aspect of the invention, the compute node containing at least one program task of the system and being adapted to perform, collectively with the other compute nodes of the system, the method for all-to-all message exchange between the program tasks of the system.

A fourth aspect of the invention provides a computer program including program code means for causing a compute node according to the third aspect of the invention to perform, collectively with other compute nodes, the method for all-to-all message exchange. A compute node can be implemented by some form of computer, the term "computer" being used here in the most general sense and including any device, component or system having a data processing capability for implementing a computer program. Moreover, a computer program embodying the invention can constitute an independent program or can be an element of a larger program, and can be supplied, for example, embodied in a computer-readable medium such as a disk or an electronic transmission for loading in a computer. The program code means of the computer program can include any expression, in any language, code or notation, of a set of instructions intended to cause a computer to perform the method in question, either directly or after either or both of (a) conversion to another language, code or notation, and (b) reproduction in a different material form.

In general, where features are described herein with reference to an embodiment of one aspect of the invention, corresponding features can be provided in embodiments of another aspect of the invention as appropriate.

The methods to be described provide for all-to-all message exchange in parallel computing systems where the communicating program tasks are connected in the system by an interconnection network with a hierarchical network topology. In general, such a network topology can be considered to include N>1 hierarchy levels which are denoted here by $l_n$, where n=1 to N. A first level $l_1$ of the hierarchy includes a plurality of groups of program tasks. Each higher level $l_{(n>1)}$ includes at least one group of level $l_{(n-1)}$ groups.

Figure 6:
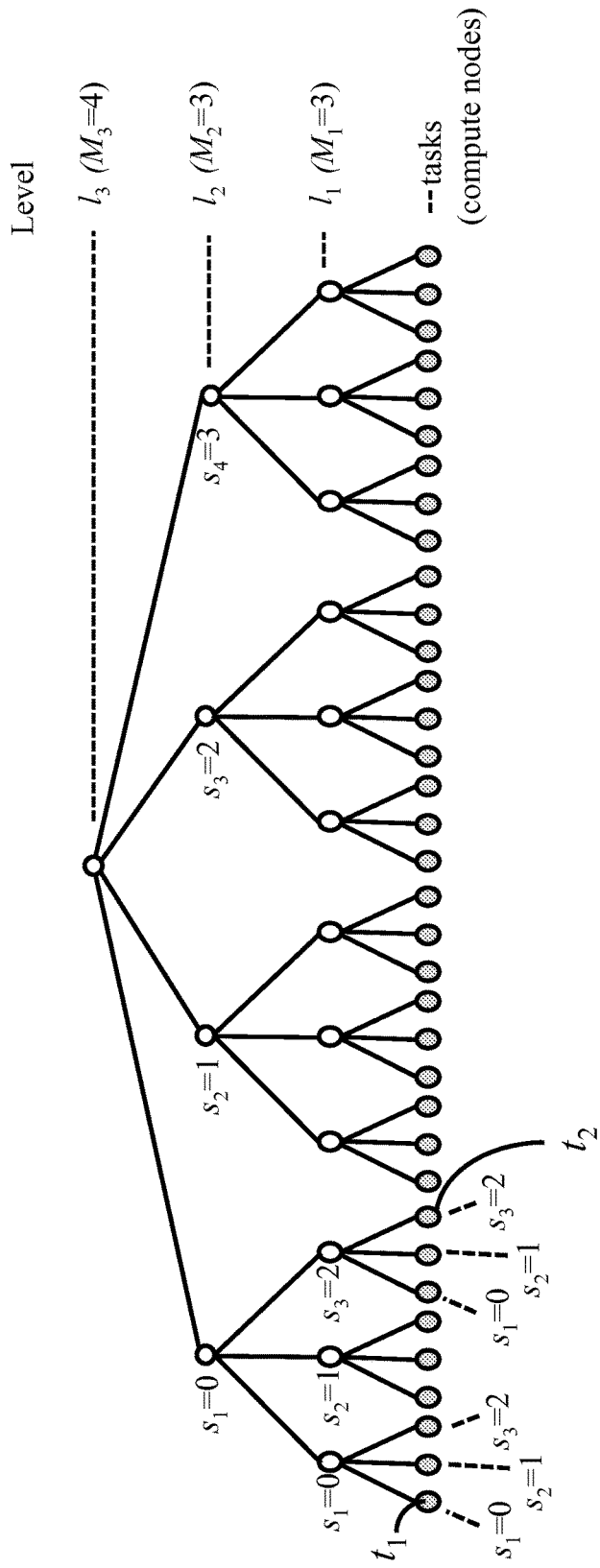
FIG. 6 indicates assignment of subgroup labels to tasks and groups of a hierarchical interconnect topology in methods embodying an aspect of the present invention.

FIG. 6 shows the topology of an exemplary system which will be used to explain how hierarchical identifiers are defined for tasks in exchange methods embodying the invention. The particular topology shown corresponds to a tree-shaped interconnection network with one task per compute node, twelve level 1 switches, four level 2 switches, and one level 3 switch. It will be understood, however, that the principles to be described can be readily extended to other hierarchical networks.

In the FIG. 6 topology, the shaded circles correspond to the set of parallel program tasks involved in the collective communication operation. Each of these tasks is implemented by software running on a compute node. Assuming one task per compute node in this example, the shaded circles represent respective compute nodes each containing one task. The first level $l_1$ of the hierarchy includes twelve level $l_1$ groups, each containing three program tasks. The second level $l_2$ of the hierarchy includes four level $l_2$ groups, each containing three level $l_1$ groups. The third, here highest, level $l_3$ of the hierarchy includes a single level $l_3$ group containing the four level $l_2$ groups. The resulting structure is a homogenous hierarchy whereby all groups in the same hierarchy level $l_n$ have the same size $M_n$ (where the "size" of a group is defined here as the number of elements it contains from the previous hierarchy level (i.e. the number of tasks in a level $l_1$ group or the number of level $l_{(n-1)}$ groups in a level $l_n$ group). In the example shown, the group sizes are thus $M_1=3$, $M_2=3$, $M_3=4$.

Generalizing to an N-level hierarchy, it can be seen that a group in level of the hierarchy is made up of $M_1$ communicating tasks, a group in level $l_2$ is made up of $M_2$ level $l_1$ groups (thus $M_1 \cdot M_2$) tasks, and so on up to level N which is made up of $M_N$ level $_{(N-1)}$ groups and thus M 1·M 2· . . . ·M N=$\Pi_{n=1}^{n=m} M_n$ communicating tasks.

A unique hierarchical identifier is defined for each task in the system. The hierarchical identifier for a task is dependent on the groups to which that task belongs in respective hierarchy levels. In the preferred embodiments of the present invention, a hierarchical identifier includes a set of N values (referred to herein as "identifier elements") $m_1, m_2, \ldots, m_N$, corresponding to respective hierarchy levels $l_1, l_2, \ldots, l_N$. The hierarchical identifiers are obtained in the following way. A unique subgroup label $s_i$, i=1 to $M_n$, is first defined for each task in each level $l_1$ group, and for each level $l_{(n-1)}$ group in each level $l_{(n>1)}$ group. While alternatives can be envisaged, in preferred embodiments of the present invention each subgroup label $s_i=(i-1)$ so that $s_1=0$, $s_2=1$, and so on, whereby the subgroup labels $s_i$ are the integers 0, 1, . . . , ($M_n-1$). In the set of N identifier elements $m_n$ (n=1 to AO of the hierarchical identifier for a task, the identifier element $m_1$, corresponding to hierarchy level $l_1$, is dependent on the subgroup label $s_i$ for that task. Each further identifier element $m_{(n>1)}$, corresponding to hierarchy level $l_{(n>1)}$, is dependent on the subgroup label $s_i$ for the level $l_{(n-1)}$ group to which that task belongs.

An assignment of subgroup labels as described above is indicated for some of the tasks and groups in FIG. 6. In the first exchange method to be described, the identifier element $m_1$ is simply equal to the subgroup label $s_i$ for that task. Similarly each further identifier element $m_{(n>1)}$ is simply the subgroup label $s_i$ for the level $l_{(n-1)}$ group to which that task belongs. Based on this system, the hierarchical identifier for the task labeled $t_1$ in the figure would be 0, 0, 0. The hierarchical identifier for the task labeled $t_2$ would be 2, 2, 0, and so on. (Note, however, that, in the subgroup labeling step, there are $M_1! \cdot M_2! \cdot \ldots \cdot M_N!$ distinct ways of labeling the entire set of subgroups/tasks, and any one of these can be utilized in the methods to be described according to embodiments of the present invention).

In addition to the hierarchical identifiers, exchange methods embodying the invention use a similar representation for the phase of the exchange process. A particular phase is identified by a phase index whose value changes for each successive phase of the exchange. In some exchange methods to be described, the phase index p includes a set of N phase elements $p_n$ corresponding to respective identity elements $m_n$ of a hierarchical identifier. Since there are as many phases as communicating tasks in the all-to-all exchange process, the phase index p can be incremented through integer values $0 \leq p < \Pi_{n=1}^{n=m} Mn$ for successive phases of the exchange. The set of N phase elements $p_1, p_2, \ldots, p_N$ provide a variable base representation of these values in the variable base $M_1, M_2, \ldots, M_N$, whereby each phase element $p_n$ corresponds to a base $M_n$. A variable base representation is similar to the familiar concept of the uniform base representation of numbers, but differs in that the base of every digit is independent of the base of every other digit. As an example, in the (uniform) base 10 representation of numbers, any digit can take values from 0 to 9 (i.e. 10-1). Similarly, in the (uniform) base 2 representation of numbers, any digit can take values from 0 to 1 (i.e. 2-1). In contrast, in a variable base (2,10) representation, the least significant digit can take values between 0 and (2-1) while the second least significant digit can take values between 0 and (10-1). Numbers 0, 1, 2, 3, 4 in this variable base would be represented as 00, 10, 01, 11, 02 (with least significant digit leftmost). Returning to the phase representation $p_1, p_2, \ldots, p_N$, it follows that, if $q_r$ is the quotient of the integer division of p by the product $M_1 \cdot M_2 \cdot \ldots \cdot M_{(r-1)}$ then each digit $p_r$ can be computed as the remainder of the integer division of $q_r$ by $M_r$.

The hierarchical identifiers described above can be determined on initial set up of a network, or on definition of a particular parallel task set for collective communication, and can be stored in memory at the compute nodes to define the identifier for each particular task. The variable base phase representation is similarly defined at compute nodes such that the phase index p can be appropriately incremented for successive phases of the message exchange. When an all-to-all exchange operation is to be performed by the task set, each task sends a message, via the network, to a respective destination task in each of the successive phases of the exchange. Thus each task both sends and receives exactly one message, so that there exists a one-to-one pairing between sending and destination tasks in each phase. For each message from each sending task, the hierarchical identifier of the paired destination task is determined dynamically via an exchange algorithm which depends on both the hierarchical identifier of the sending task and the topology of the interconnection network, as well as the value of the phase index. The exchange algorithm is such that the resulting exchange pattern exploits hierarchical distance in the network topology in a desired manner.

In a first exchange method embodying an aspect of the present invention, the hierarchical identifier of the destination task for each message is determined from the hierarchical identifier of the sending task, and the variable base representation of the phase, via the exchange function:

$$m_n^d = (m_n^s + p_n) \mathrm{modulo} M_n, n=1 \text{ to } N, \quad (1)$$

where:
$m_n^d$ is the $n^{th}$ identity element of the hierarchical identifier of the destination task; and
$m_n^s$ is the $n^{th}$ identity element of the hierarchical identifier of the sending task.

Figure 7:
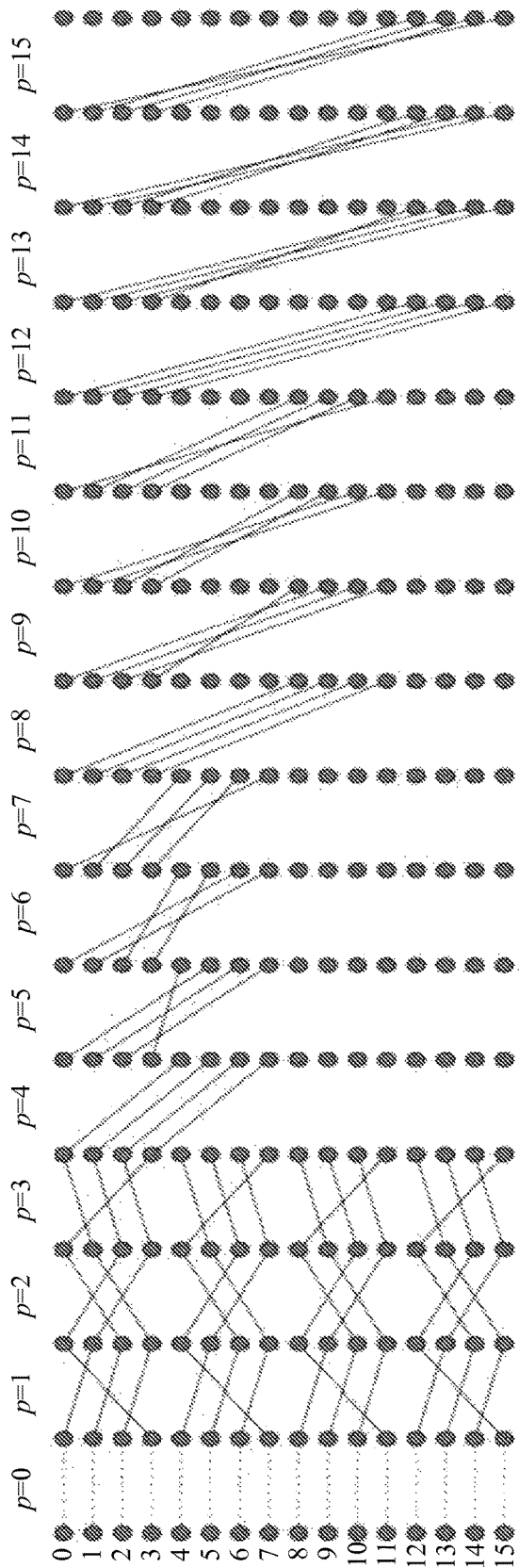
FIG. 7 illustrates an exchange pattern for a first all-to-all exchange method embodying an aspect of the present invention.

With this function, the addition in each step is performed modulo $M_n$ and thus depends on the actual group size at the appropriate level of the interconnection network hierarchy. The effect of this exchange function is illustrated in FIG. 7. This shows the resulting exchange pattern for a system with the hierarchical topology of FIG. 4, corresponding to four communicating tasks in each level $l_1$ group, and four level $l_1$ groups in the single level $l_2$ group. Phases 0 to 3 are local (corresponding to exchanges between tasks in the same level $l_1$ group), while the remaining phases are remote. For the remote phases, only the exchanges originating on tasks in the first $l_1$ group are shown for clarity. (Note that FIG. 7 illustrates only one possible exchange pattern corresponding to a particular subgroup labeling system. This labelling is orthogonal to the properties of the exchange, and each one of the $M_1! \cdot M_2! \cdot \ldots \cdot M_N!$ distinct labeling systems leads to a new, distinct exchange pattern.)

It can be seen from FIG. 7 that the exchange pattern for this all-to-all message exchange progresses in order of increasing hierarchical distance in the network topology. In particular, exchanges are performed first within the lowest level of the hierarchy, then within the second level of the hierarchy exclusively between nodes that do not belong to the same first hierarchy level group, and so on. The message exchange thus occurs in order of increasing remoteness, with the consequent performance advantages discussed earlier. Moreover, in contrast to the XOR exchange, this is achieved in a manner that is faithful to the actual hierarchical topology of the physical network. Unlike an XOR exchange, the exchange defined by Equation (1) imposes no overlay whatsoever on the underlying physical network and simply uses the intrinsic topological properties of the real network hierarchy.

A further advantage of the above exchange process is that it can be applied to direct and indirect hierarchical networks including both tree-shaped networks (e.g. standard trees, and fat trees in their various forms such as XGFTs, slimmed fat trees, etc.) and dragonfly networks. However, while this first exchange has the most regular shape of the embodiments described here, this regularity comes at the price of certain drawbacks in some types of topology. In direct hierarchical networks such as the dragonfly, for instance, the first exchange tends to overload remote links. A second exchange, which mitigates this effect, is described in the following.

In the second exchange method embodying an aspect of the present invention, in addition to the subgroup label $s_i$, an offset is assigned to each task within each group that the task belongs to in each hierarchy level. In particular, for the tasks belonging to each level $l_n$ group, an offset value O is defined for each task, this offset value being unique among tasks in that group. In this particular example, the offset values O for the tasks belonging to each level $l_n$ group are the integers $\{0, 1, \ldots, (T_n-1)\}$ where $T_n$ is the number of tasks in that group. In this embodiment, the hierarchical identifier of the destination task for a message is determined using a modified phase representation, referred to here as an "offset-phase representation", denoted by $p^s$. This offset-phase representation $p^s$ is specific to the sending task for a message. In particular, the offset-phase representation $p^s$ depends on both the phase index p and also the offset values defined for the sending task in the groups to which that task belongs in respective hierarchy levels. In this preferred embodiment of the present invention, for a given sending task s in a given phase, the offset-phase representation $p^s$ includes a set of N components $p_n^s$ which are dependent on respective corresponding phase elements $p_n$ of the phase index p for that phase such that:

$$p_1^s = p_1;$$

for n>1, $p_n^s = 0$ if the corresponding phase element $p_n = 0$; and otherwise
$p_n^s = [+(p_n-1)+O \text{ (for task s in the level } l_{(n-1)} \text{ group to which s belongs)}] \mathrm{modulo } (M_n-1)$.

Compared to the first embodiment, therefore, each non-zero phase element $p_{(n>1)}$ of the original phase index used by a source task to compute the destination of its messages is effectively augmented by the offset assigned to that source task in the immediately inferior hierarchy level to the level $l_n$ corresponding to that phase element $p_n$. The resulting offset-phase representation $p^s$ is then used in place of the phase index p in Equation (1) above to obtain the exchange function for the second embodiment. That is, the hierarchical identifier of the destination task for each message is determined from the hierarchical identifier of the sending task, and the offset-phase representation, via the exchange function:

$$m_n^d = (m_n^s + p_n^s) \mathrm{modulo} M_n, n=1 \text{ to } N, \quad (2)$$

Figure 4:
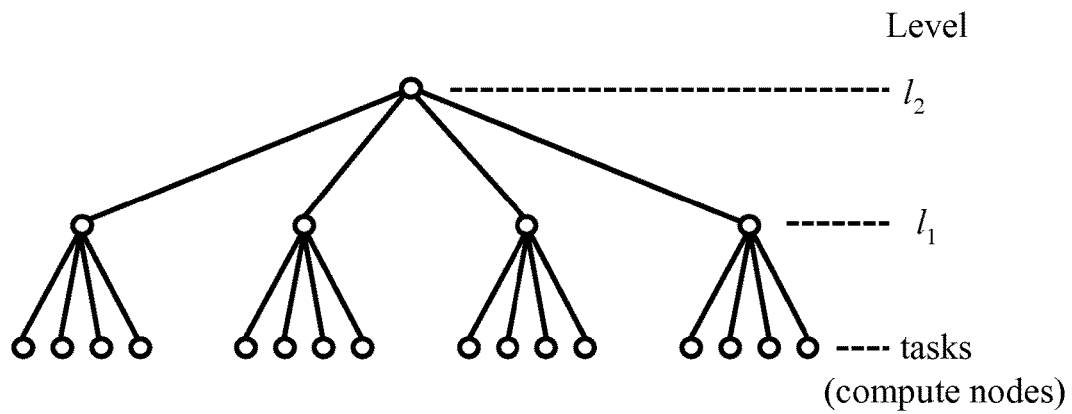
FIG. 4 shows the network topology for a linear shift exchange pattern for an exemplary network topology, according to an embodiment of the present invention.

The resulting exchange pattern is shown in FIG. 8, again for the hierarchical topology of FIG. 4. As before, phases 0 to 3 are local while the subsequent phases are remote, and only exchanges originating on tasks in the first level $l_1$ group are shown in remote phases for clarity.

Figure 8:
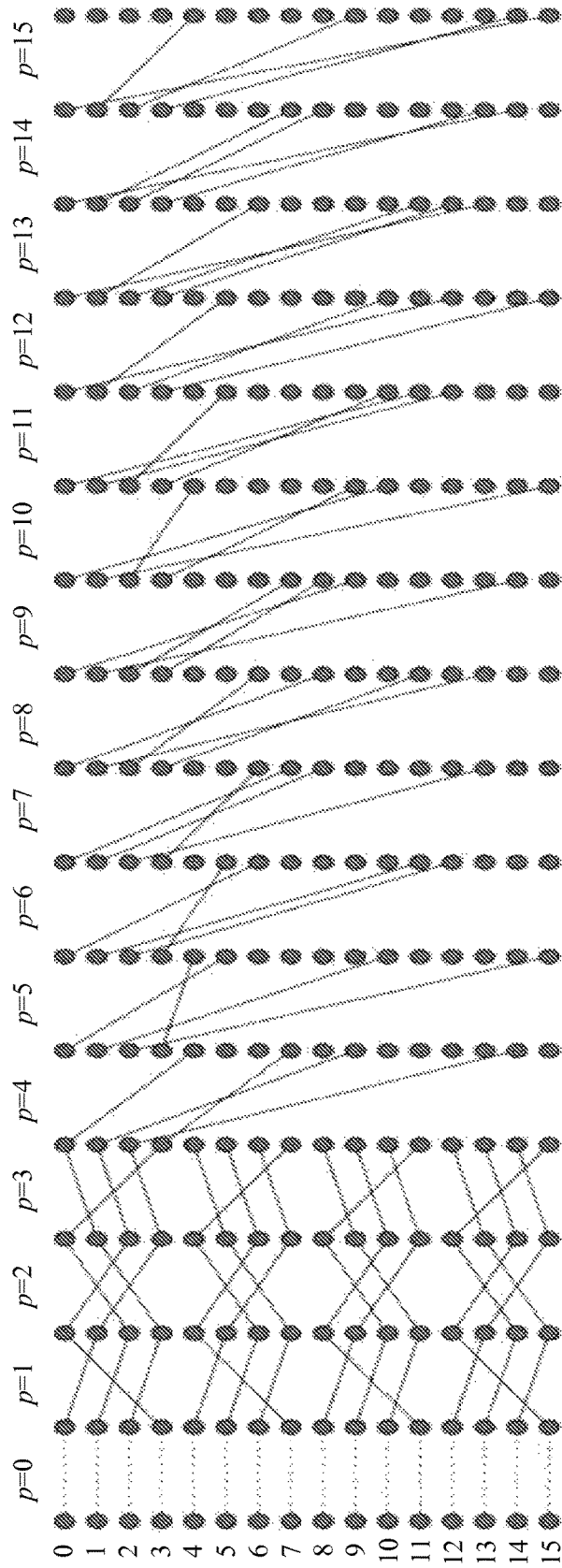
FIG. 8 illustrates an exchange pattern for a second all-to-all exchange method embodying an aspect of the present invention.

It can be seen from FIG. 8 that the exchange pattern again progresses in order of increasing hierarchical distance in the network topology. However, this method provides a load balanced hierarchical exchange which reduces remote link contention to a minimum at the expense of a minor loss of symmetry, while maintaining the hierarchical properties of the exchange and increasing performance.

Remaining in the context of dragonfly networks, with the second exchange just described, exchanges in the same phase have different latencies due to different path lengths when traversing the network. This asymmetry can be removed, greatly increasing intra-phase synchronization as a result, with a third exchange method embodying the invention.

The third exchange method is particularly applicable to dragonfly networks. In these networks, the groups in a level $l_c$ of the hierarchy correspond to respective switches connected to compute nodes containing tasks, where c=1 if each compute node contains a single task and c=2 if each compute node contains a plurality of tasks.

Figure 2:
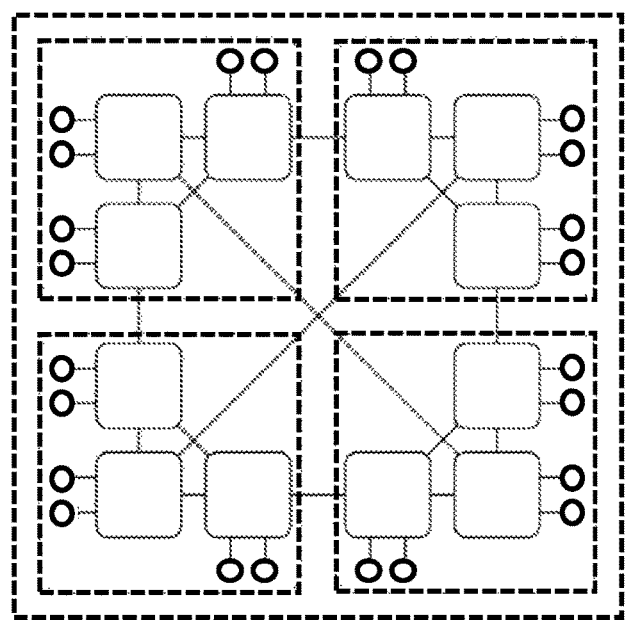
FIG. 2 shows an example of a dragonfly network, according to an embodiment of the present invention.
Figure 3:
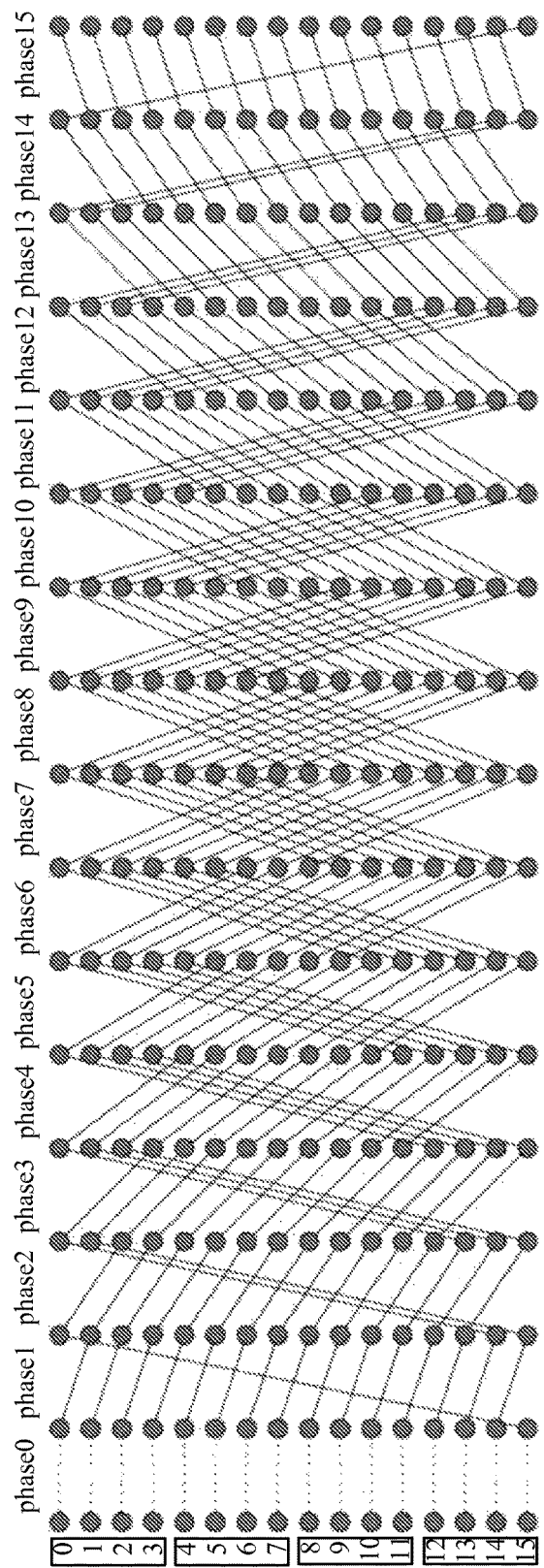
FIG. 3 illustrates a linear shift exchange pattern for an exemplary network topology, according to an embodiment of the present invention.
Figure 9:
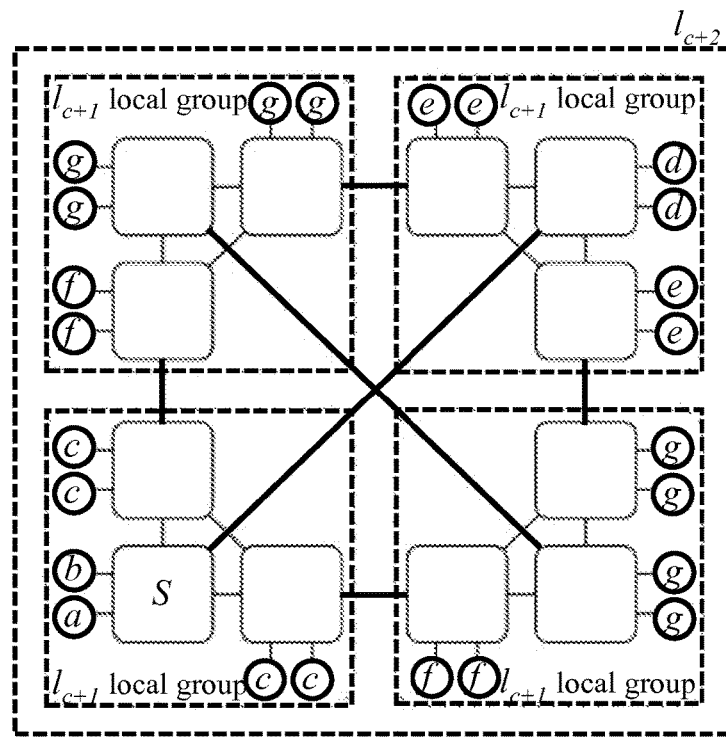
FIG. 9 indicates ordering of steps in a third all-to-all exchange method embodying an aspect of the present invention.
Figure 5:
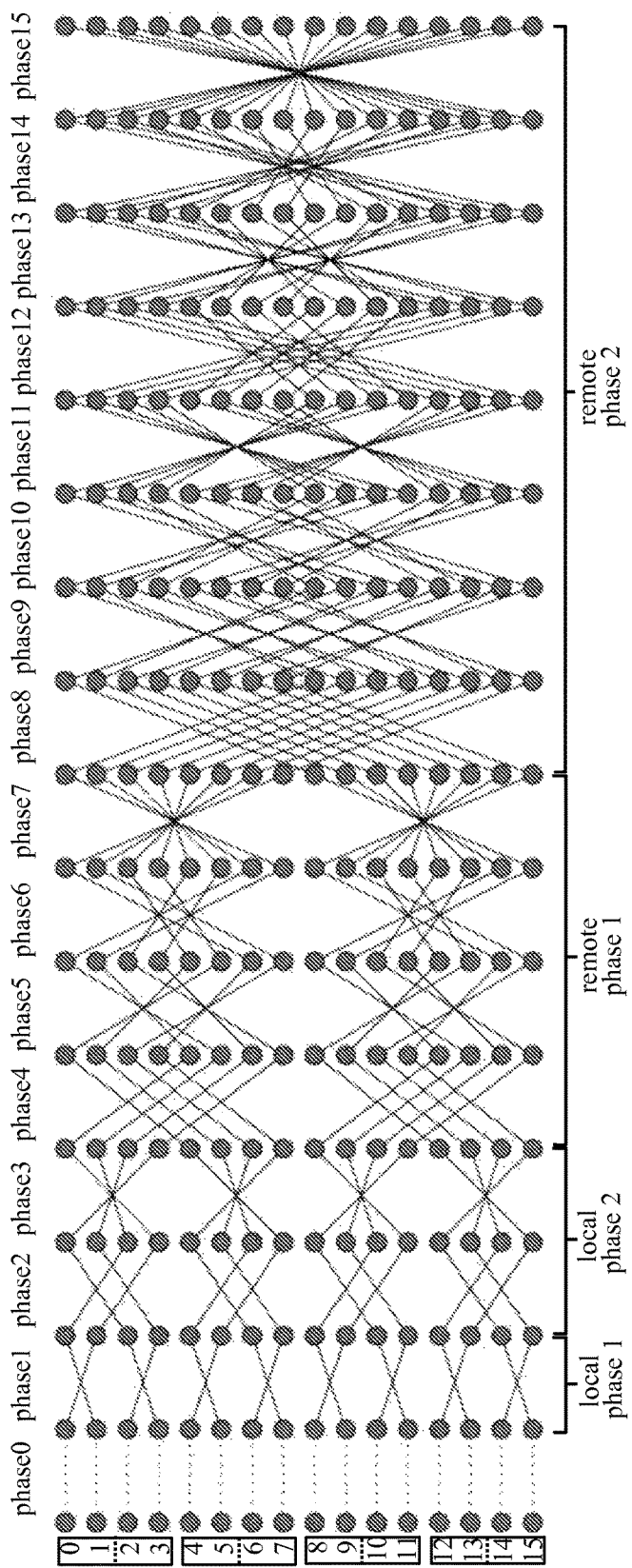
FIG. 5 illustrates an XOR exchange pattern for the network topology for a linear shift exchange pattern for an exemplary network topology, according to an embodiment of the present invention.

In FIG. 2, for instance, c=1 whereby level $l_1$ groups correspond to switches. If, however, each compute node contained multiple tasks in this network, then the compute nodes would correspond to level $l_1$ groups and level $l_2$ would represent the first level of switches. In general for a dragonfly topology, therefore, each level $l_{c+1}$ group corresponds to a local group of level $l_c$ switches. Each of these level $l_c$ switches is connected, via a distant link, to a switch in at least one other level $l_{c+1}$ group. Each level $l_{c+2}$ group then corresponds to a group of level $l_{c+1}$ groups. FIG. 9 indicates the various groups for the simple dragonfly network of FIG. 2. Distant links are shown in bold in the figure. In this example, each switch is connected via a distant link to a switch in only one other local group. In other dragonfly networks, according to embodiments of the present invention, each switch may be connected via a distant link to a switch in more than one other local group.

Based on the foregoing definition, the third exchange method determines the destination tasks for messages from a given sending task by selecting the destination tasks in a specific order. In particular, in successive phases of the exchange, each task sends messages to respective destination tasks selected in order of:

a. tasks in the same compute node as the sending task;

b. tasks in compute nodes connected to the same level $l_c$ switch S as the sending task;

c. tasks in compute nodes connected to switches in the same level $l_{c+1}$ local group as the switch S;

d. tasks in compute nodes connected to the switch S', in at least one other level $l_{c+1}$ group, which is connected to the switch S via a distant link;

e. tasks in compute nodes connected to level $l_c$ switches in the same level $l_{c+1}$ local group as the switch S';

f. tasks in compute nodes connected to the switch S', in at least one other level $l_{c+1}$ group, which is connected via a distant link to another switch in the same level $l_{c+1}$ local group as the switch S;

g. all other tasks.

In this third exchange method therefore, the hierarchical identifiers of the destination tasks for messages from a sending task are determined in successive phases, based on the hierarchical identifier of the sending task and the network topology, so as to follow the above order for each sending task. FIG. 9 indicates the nodes corresponding to each of the above steps for a particular sending task. Here, the node labeled "a" is the node containing the sending task. Nodes containing the tasks reached by subsequent steps of the above process are labeled with the letter corresponding to the appropriate step.

The hierarchical identifiers in this method, according to an aspect of the present invention, can be defined as for the first or second exchange, or can depend in some other way on the groups to which tasks belong in the different hierarchy levels. Phase can similarly be expressed by a phase index as described above or in some other convenient manner. Particular algorithms for correctly and efficiently implementing the above message order in a given scenario, particularly by ensuring that the properties of an all-to-all exchange are maintained and by borrowing from the principles used in defining the second exchange such as the load balancing approach, will be apparent to those skilled in the art. When using this load-balancing approach, the resulting exchange pattern for the third exchange method corresponds generally to that for the second exchange, progressing in order of increasing hierarchical distance, but also equalizes latency for message exchanges in the same phase, thereby improving intra-phase synchronization. The latency is equalized in that in any given phase, the paths taken by each and every message are identical, in that they are made up of the same number and types of links, in the same order. As such, in absence of network contention, a message will take the same amount of time as any other message to traverse its path. If contention is present, however, latency can vary, but the latency optimization property of the exchange refers precisely to this equalizing of paths.

A fourth exchange method embodying an aspect of the present invention addresses the issue of bandwidth utilization in slimmed fat tree networks. For indirect hierarchical topologies such as XGFTs, typical network designs provide enough bandwidth capacity between groups at the same hierarchical level and between hierarchical levels to route any permutation traffic pattern in a contention free manner (a permutation traffic pattern is a traffic pattern where every source sends to a single destination and the set of destinations is identical to the set of sources). As such, load balancing offers no additional benefit. Furthermore, owing to the indirect nature of the topology, the first exchange method described above is already latency-balanced as well. So in this typical case (it is the case for all k-ary n-trees for example), the first exchange method is already optimal. New designs, however, seek to reduce network cost by reducing a portion of the available bandwidth. This is the case for the so-called slimmed fat trees. The purely hierarchical exchange methods described above require the full bandwidth in some phases, while other phases leave portions of the network completely unused. The fourth exchange method tends to use the network more uniformly across the phases, thus optimizing bandwidth use at the expense of the symmetry and hierarchical properties of the exchange. In other words, this exchange method permits tuning of the trade-off between hierarchical structure on the one hand and bandwidth utilization on the other. This allows for optimum performance with $1/M_N$ less bisection bandwidth than that of a non-slimmed design, so with as little as half the non-slimmed bisection bandwidth.

In the fourth exchange method, the hierarchical identifier of the first method is used to obtain a task index t for each task by treating the hierarchical identifier as a variable base representation in the variable base $M_1, M_2, \ldots, M_N$. That is, the task index t is the value indicated by the set of N identifier elements $m_n$ of the hierarchical identifier for the task in a variable base representation in which each identifier element $m_n$ corresponds to a base $M_n$.

A secondary identifier for each task is then defined as the representation of the task index t for that task in a different variable base $M_N, M_{(N-1)}, \ldots, M_{k+2}, M_{k+1}, M_1, M_2, \ldots, M_k$, where k is a tuning parameter selected such that $1 \leq k \leq N$. Thus, the secondary identifier for a task includes a set of N secondary elements $m_j$, corresponding to respective bases $M_j$, where $j=N, (N-1), \ldots, k+2, k+1, 1, 2, \ldots, k$. The phase index p (whose value is incremented here through integer values $0 \leq p < \Pi_{n=1}^{n=m} M_n$ for successive phases of the exchange) is then expressed in this new variable base. Thus, the phase index p includes a set of N phase elements $p_j$ providing a variable base representation of the integer values $0 \leq p < \Pi_{n=1}^{n=m} M_n$ in the variable base $M_N, M_{(N-1)}, \ldots, M_{k+2}, M_{k+1}, M_1, M_2, \ldots, M_k$.

Modulo addition is then performed as before using these new representations of the sending task and the phase index. In order to obtain the hierarchical identifier of the destination task, the digits in the variable-base result are simply permuted back into the original hierarchical order. That is, for each message sent in each phase of the exchange, the N identity elements of the hierarchical identifier of the destination task for that message are determined by:
(a) obtaining the secondary identifier of the destination task as $$m_n^d = (m_n^s + p_n^s) \mathrm{modulo} M_n, j=N, (N-1), \ldots, k+2, k+1, 1, 2, \ldots, k,$$

where $m_n^d$ is the $j^{th}$ element of the secondary identifier of the destination task, and $m_j^s$ is the $j^{th}$ element of the secondary identifier of the sending task; and then
(b) permuting the N elements $m_n^d$ of the secondary identifier of the destination task into the base order $M_n$, n=1 to N.

Figure 10:
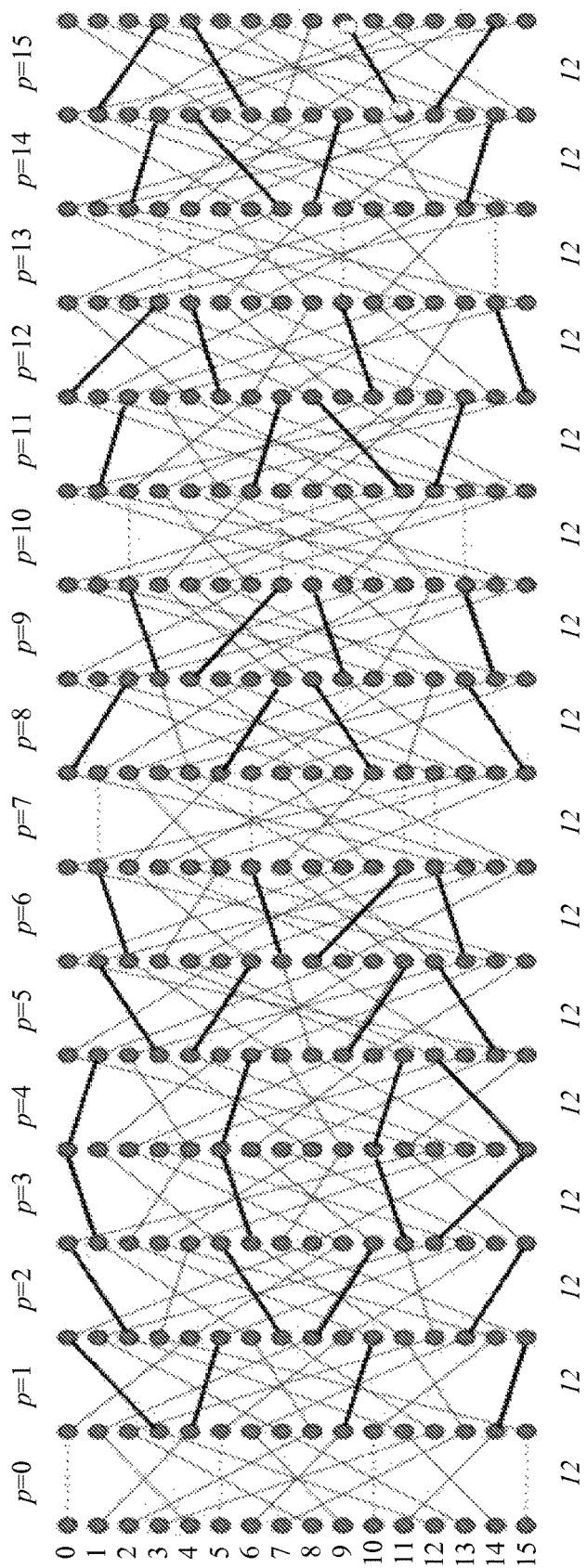
FIG. 10 illustrates an exchange pattern for a fourth all-to-all exchange method embodying an aspect of the present invention.

The resulting exchange pattern for this fourth exchange provides a trade-off, tunable via the value selected for tuning parameter k, between bandwidth optimization and progressing in order of increasing hierarchical distance in the network topology. The smaller the chosen value for the tuning parameter k, the more optimized the bandwidth occupation becomes (the more levels in the extended generalized fat tree, starting with the top level, are bandwidth optimized), culminating for k=1 to a complete optimization. The larger the chosen value of k, the more hierarchical the exchange, culminating for k=N to the first exchange method described above. The k=1 exchange pattern is illustrated in FIG. 10 for an extended generalized fat tree with two levels and downward branching parameters 4 and 4. Lines other than those shown in bold represent exchanges that cross the bisection of the network. One can see that, contrary to purely hierarchical exchanges, bisection usage (marked for each phase at the bottom of the figure) is uniformly spread out across the phases of the exchange, leading to optimization of bandwidth usage. This particular pattern therefore exploits hierarchical distance in the topology by ensuring that the degree of "increasing remoteness" is effectively minimized and complete bandwidth-optimization is achieved. The communicating pairs in a single phase are all distributed across as many levels of remoteness as possible. This can optimize minimum cost fat trees (significantly reducing the bisection bandwidth at the top level), due to a perfect balance of the bandwidth utilization of all the links of the complete fat tree. No prior algorithm could achieve optimum performance in fat trees with halved bisection bandwidth. In particular, the linear shift and XOR (and its variations) exchange patterns perform poorly in reduced-cost networks.

It will be seen that the various embodiments described above provide families of efficient, topology-aware exchange patterns that inherently take into account the hierarchical structure of the network topology. A very important advantage of these exchanges is that their application is not, like XOR, restricted to a limited class of hierarchical network designs. Furthermore, performance-wise, these exchanges surpass both XOR and linear shift in slimmed fat trees by 20 to 40%. In dragonflies, the difference is much more pronounced, becoming as large as 300% (the exchange completes three times faster) compared to basic linear shift and as large as 60% compared to randomized linear shift, which is currently considered the best approach (XOR, of course, is not applicable in this case).

It will be appreciated that many changes and modifications can be made to the exemplary embodiments described. For example, in alternative embodiments of the exchanges described above, the structure of the exchange in every phase is preserved entirely, but the phases themselves are performed in a different order to the basic p=0, 1, 2, ..., $((\Pi_{n=1}^{n=m} M_n)-1)$ order used above. This phase order can be any permutation of the sequence p=0, 1, 2, ..., $((\Pi_{n=1}^{n=m} M_n)-1)$. That is, the above exchange methods can be modified by changing the order of the phases to an arbitrary permutation of the order described. For the first, second and fourth exchange methods, this can be achieved by using a phase index p which takes a different one of the integer values $0 \leq p < \Pi_{n=1}^{n=m} M_n$ for each successive phase of the exchange, where these values can occur in any order. For the third exchange method described above, the resulting phases of the exchange obtained with this method can simply be performed in another phase order. Where the earlier exchange processes proceeded in order of increasing remoteness (i.e. increasing hierarchical distance in the network topology), with a different phase ordering the message exchanges in any given phase would have the same "amount of remoteness". That is, the same hierarchical distance would be traversed by all messages in any particular phase. The fact that the structure of each individual phase remains unaffected by this reordering will still lead to preservation of most of the performance gains described earlier.

While some systems have been described above as having one task per compute node for simplicity, operation is essentially the same where there is more than one task per compute node. This effectively adds an additional hierarchy level between the task level and the switch level. Thus, in systems with a single task per compute node, the level $l_1$ groups correspond to switches connected to groups of compute nodes. In systems where compute nodes contain more than one task, the level $l_1$ groups correspond to compute nodes.

While a particular exchange function can be predetermined for a given network, this function could of course be changed dynamically in operation, e.g. to adjust to changing conditions or operating requirements.

Many other changes and modifications can be made to the embodiments described without departing from the scope of the invention. More generally, while the present invention has been described with reference to certain embodiments, it will be understood by those skilled in the art that various changes can be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

What is claimed is:

1. A computer-implemented topology-aware method for all-to-all message exchange between program tasks running on a plurality of compute nodes, the compute nodes collectively forming an interconnection network with a hierarchical network topology connecting the program tasks to each other, the hierarchical network topology including N>1 hierarchy levels $l_n$, n=1 to N, in which a first level $l_1$ includes a plurality of groups of tasks running on a plurality of corresponding compute nodes, and each higher level $l_{(n>1)}$ includes at least one group of level $l_{(n-1)}$ groups, the topology-aware method comprising:
   defining, by each compute node of the plurality of compute nodes, for each task, a hierarchical identifier which is unique and dependent on the level groups to which each task belongs in respective hierarchy levels of the hierarchical network topology;
   sending, by a source compute node of the plurality of compute nodes, a message, at each task in each of successive phases of the exchange, via the interconnection network, to a respective destination task running on a corresponding destination compute node whose hierarchical identifier is determined; and
   using, by the source compute node of the plurality of compute nodes, the hierarchical identifier determined for the destination task to send the program task and the network topology, such that the resulting exchange pattern for the all-to-all message exchange between the plurality of compute nodes exploits a hierarchical distance in the hierarchical network topology,
   wherein:
      a group of tasks in a same hierarchy level $l_n$ have a same size $M_n$;
      a subgroup label $s_i$, i=1 to $M_n$, is defined for each task in each level $l_1$ group, and for each level $l_{(n-1)}$ group in each level $l_{(n>1)}$ group; and
      the hierarchical identifier determined for the destination task includes a set of N identifier elements corresponding to respective hierarchy levels, wherein an identifier element $m_1$, corresponding to the hierarchy level $l_1$, is dependent on the subgroup label $s_i$ for that task and, wherein an identifier element $m_{(n>1)}$, corresponding to a hierarchy level $l_{(n>1)}$, is dependent on the subgroup label $s_i$ for the level $l_{(n-1)}$ group to which that task belongs;
   wherein for each message sent in the exchange, the hierarchical identifier of the destination task for a message is further dependent on a phase index p whose value changes for each successive phase of the exchange;
   wherein the phase index p includes a set of N phase elements $p_n$ corresponding to respective identity elements $m_n$ of the hierarchical identifier;
   wherein the phase index p takes a different one of the integer values
   $$0 \le p < \prod_{n=1}^{n=m} Mn$$
   for each successive phase of the exchange and, wherein the set of N phase elements $p_n$ provides a variable base representation of the values in which each phase element $p_n$ corresponds to a base $M_n$;
   wherein for each message sent in each phase of the exchange, the N identity elements of the hierarchical identifier of the destination task for a message is determined as $m_n^d = (m_n^s + p_m) \mod M_n$, n=1 to N, where $m_n^d$ is the $n^{th}$ identity element of the hierarchical identifier of the destination task and $m_n^z$ is the $n^{th}$ identity element of the hierarchical identifier of a sending task for the message;
   wherein:
      for the tasks belonging to each level $l_n$ group, an offset value O is defined for each task, the offset value being unique among tasks in that group; and
      for each message sent by each task in each phase of the exchange, the hierarchical identifier of the destination task for a message is dependent on an offset-phase representation $p^s$ which depends on the phase index p for the phase and the offset values defined for the task in the groups to which the task belongs in respective hierarchy levels.

2. The computer-implemented topology-aware method of claim 1, wherein the subgroup label $s_i = (i-1)$.

3. The computer-implemented topology-aware method of claim 1, wherein in the hierarchical identifier determined for the destination task, the identifier element $m_1$ is the subgroup label $s_i$ for the task, and each identifier element $m_{(n>1)}$ is the subgroup label $s_i$ for the level $l_{(n-1)}$ group to which that task belongs.

4. The computer-implemented topology-aware method of claim 1, wherein, for each message sent by each task in each phase of the exchange, the offset-phase representation $p^s$ includes a set of N components $p_n^s$ dependent on a respective corresponding phase elements $p_n$ of the phase index p for the phase such that $p_1^s = p_1$, for n>1, $p_n^s = 0$ if the corresponding phase element $p_n = 0$, and otherwise, $p_n^s = 1$ plus the sum, modulo $(M_n-1)$, of $(p_n-1)$ and the offset value O for the task in the level $l_{(n-1)}$ group to which the task belongs.

5. The computer-implemented topology-aware method of claim 4, wherein for each message sent in each of the phases of the exchange, the N identity elements of the hierarchical identifier of the destination task for the message is determined as $m_m^d = (m_n^s + p_n^s) \mod M_n$, n=1 to N, where $m_n^d$ is the $n^{th}$ identity element of the hierarchical identifier of the destination task and $m_n^s$ is the $n^{th}$ identity element of the hierarchical identifier of a sending task for the message.

6. The computer-implemented topology-aware method of claim 2, wherein:
   a secondary identifier is defined for each task as the representation of a task index t for that task in a variable base $M_N, M_{(N-1)}, \ldots, M_{k+2}, M_{k+1}, M_1, M_2, \ldots, M_k$, where k is a predetermined tuning parameter such that $1 \le k \le N$, wherein the task index t is the value indicated by the set of N identifier elements $m_n$ of the hierarchical identifier for the task in a variable base representation and, wherein each identifier element $m_n$ corresponds to a base $M_n$, whereby the secondary identifier includes a set of N secondary elements $m_j$, corresponding to respective bases $M_j$, where j=N, (N-1), \ldots, k+2, k+1, 1, 2, \ldots, k;
   for each message sent in each of the phases of the exchange, the hierarchical identifier of the destination task for that message is further dependent on a phase index p which takes a different one of the integer values $$0 \leq p < \prod_{n=1}^{n=m} Mn$$

for each successive phase of the exchange, the phase index p including a set of N phase elements $p_j$ providing a variable base representation of the integer values in the variable base $M_N, M_{(N-1)}, \ldots, M_{k+2}, M_{k+1}, M_1, M_2, \ldots, M_k$; and for each message sent in each of the phases of the exchange, the N identity elements of the hierarchical identifier of the destination task for that message are determined by obtaining the secondary identifier of the destination task as $m_j^d = (m_j^a + p_j) \text{modulo } M_j$, j=N, (N−1), ..., k+2, k+1, 1, 2, ..., k, where $m_j^d$ is the $j^{th}$ element of the secondary identifier of the destination task and $m_j^z$ is the $j^{th}$ element of the secondary identifier of the sending task for the message, and permuting the N elements $m_j^d$ of the secondary identifier of the destination task into the base order $M_n$, n=1 to N.

7. The computer-implemented topology-aware method of claim 1, further comprising:

dynamically determining, at each task, the hierarchical identifier of the destination task for the message sent in each phase of the exchange.

* * * * *